(12) United States Patent
Vandeginste

(10) Patent No.: US 7,053,957 B1
(45) Date of Patent: May 30, 2006

(54) DEMONSTRATING AN EFFECT OF A SIGNAL-PROCESSING OPERATION BY A SIGNAL-PROCESSING DEVICE

(75) Inventor: Gudrun Vandeginste, Bruges (BE)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/368,852

(22) Filed: Aug. 5, 1999

(30) Foreign Application Priority Data

Aug. 7, 1998 (EP) .............................................. 98202656

(51) Int. Cl.
*H04N 5/14* (2006.01)

(52) U.S. Cl. ....................................... 348/570; 348/180
(58) Field of Classification Search ................. 348/569, 348/570, 553, 554, 734, 180, 181, 184, 189, 348/571, 705, 706, 722; H04N 5/14
See application file for complete search history.

(56) References Cited

U.S. PATENT DOCUMENTS

| | | | | |
|---|---|---|---|---|
| 5,185,666 A | * | 2/1993 | Capitant et al. ............. | 348/588 |
| 5,247,358 A | * | 9/1993 | Richards ...................... | 348/189 |
| 5,499,019 A | | 3/1996 | Burgan et al. ............... | 340/825 |
| 5,574,494 A | * | 11/1996 | Marics ......................... | 348/570 |
| 5,654,751 A | | 8/1997 | Richard ....................... | 348/192 |
| 5,724,102 A | * | 3/1998 | Harrison et al. ............. | 348/552 |
| 5,745,798 A | | 4/1998 | Hirasawa ...................... | 396/51 |
| 5,796,945 A | * | 8/1998 | Tarabella ..................... | 395/761 |
| 5,961,333 A | * | 10/1999 | Harrison et al. ......... | 434/307 A |
| 6,011,539 A | * | 1/2000 | Hamilton et al. ............ | 348/569 |
| 6,266,098 B1 | * | 7/2001 | Cove et al. .................. | 348/563 |

FOREIGN PATENT DOCUMENTS

EP               0417728 A2     3/1991

* cited by examiner

Primary Examiner—Michael H. Lee

(57) ABSTRACT

The invention relates to a device for demonstrating an effect of a selected signal-processing operation. The device comprises signal-processing means (3) for processing incoming signals to supply said signals to presentation means (9), and demonstration means (7, 10, 12) for demonstrating the selected processing operation. The device further comprises storage means (11) for storing a demonstration signal which is specifically suitable for effectively demonstrating the feature. Upon activation of the demonstration means, a demonstration signal which is most suitable for demonstrating said processing operation is read from the storage means, processed by the signal-processing means and presented on the presentation means.

16 Claims, 1 Drawing Sheet

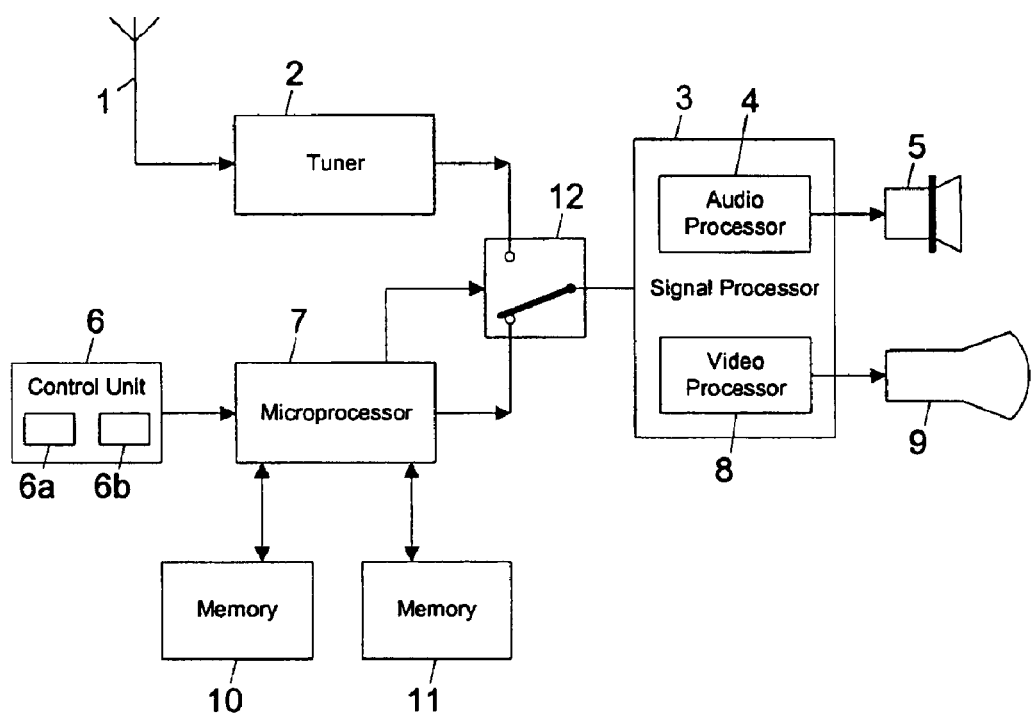

DEMONSTRATING AN EFFECT OF A SIGNAL-PROCESSING OPERATION BY A SIGNAL-PROCESSING DEVICE

This application claims priority to European Patent Application No. 98202656.9 filed Aug. 7, 1998.

FIELD OF THE INVENTION

The invention relates to a device for demonstrating an effect of a selected signal-processing operation as defined in the preamble of claim 1. The invention further relates to an apparatus as defined in the preamble of claim 8, a television receiver as defined in the preamble of claim 10 and a method of demonstrating an effect of a selected signal-processing operation as defined in the preamble of claim 11.

BACKGROUND OF THE INVENTION

An apparatus as defined above is disclosed in EP 0 417 728 A2. The known apparatus, e.g. a television receiver or a video recorder, comprises a user-operable control circuit for generating a sequence of commands which cause a number of functions of the apparatus to be invoked consecutively. Examples of functions invoked by the control circuit are picture-in-picture, zoom-effect, mosaic screen and features for enhancing the picture quality, such as noise filters, cross-color and interference reduction. The effects of the functions invoked by the control circuit are observable on the television screen, giving a potential buyer of the apparatus an impression of its functions.

A disadvantage of the known apparatus is that the effectiveness of the demonstration of said functions heavily depends on the video contents being received at the time of demonstration.

OBJECT AND SUMMARY OF THE INVENTION

It is an object of the invention to provide a device for demonstrating an effect of a selected signal-processing operation as defined above, which provides an improved demonstration of the signal-processing operation. To this end, a first aspect of the invention provides a device as claimed in claim 1. A second aspect of the invention provides an apparatus as claimed in claim 8. A third aspect of the invention provides a television receiver as claimed in claim 10. A fourth aspect of the invention provides a method as claimed in claim 11. Advantageous embodiments of the invention are defined in the dependent claims.

The device for demonstrating an effect of a selected signal-processing operation as claimed in claim 1 comprises a signal-processing device for processing incoming signals to obtain processed signals, and demonstration means, similar to the control circuit of the known apparatus, for demonstrating the effects of the processing device. A user command selects which signal-processing operation will be performed by the processing device. As an example, the processing device may be a video signal processor for processing an incoming video signal to obtain RGB signals to be supplied to a display. The user command may switch on a black-stretch feature or a noise reduction operation. Dependent on the processing operation demonstrated, a specific portion of the demonstration contents most suited for demonstrating the effect of said processing operation is retrieved from the storage means and processed by the signal-processing device before it is presented on the presentation means. In this way, it is achieved that the effect of the processing operation is demonstrated more effectively, thus convincing potential buyers of the quality of the device.

In an embodiment of the invention as claimed in claim 2, switching means select the demonstration signals or the incoming signals to be processed by the signal-processing device in response to the user command and presented on the presentation means, thus excluding any conditions caused by the incoming signals which may diminish the effectiveness of the demonstration.

In an embodiment of the invention as claimed in claim 3, the signal-processing device is adapted to process video signals which are presented on a display screen, said processing operation being conceived, for example, to enhance the quality of the pictures displayed. For demonstrating such a feature, a static picture especially suited for demonstrating the effect of that feature is retrieved from the storage means and presented on the display screen. For example, when demonstrating a black-stretch feature, a picture comprising grey areas is presented, and when demonstrating a comb filter, a picture comprising patterns of fine black and white lines is presented. For demonstrating features which are intended to improve a presentation involving moving pictures, e.g. Natural Motion, a sequence of pictures can be stored in the storage means and presented consecutively as a moving video presentation. Such a moving video presentation can be iterated a number of times, to give the viewer multiple opportunities to appreciate the effect of the feature.

In an embodiment of the invention as claimed in claim 6, it is achieved that the viewer can easily perceive the difference between the apparatus having the demonstrated feature and an apparatus not having that feature. In the case of video contents, this difference can be alternatively demonstrated by presenting the demonstration signals in a split-screen form, which enables the viewer to perceive the difference at a glance. The viewer could also be enabled to activate and deactivate the feature by hand during the demonstration.

In an embodiment of the invention as claimed in claim 9, said user command comprises the operation of control means which are dedicated to control functions of the apparatus which are different from the demonstration function. Modern appliances such as VCRs and Tvs often have a remote control for controlling most functions. The appliances themselves have only a few buttons for controlling the major functions, such as channel selection and volume control. A dedicated button for activating the demonstration is not desirable, because production costs would increase and the demonstration function should be preferably known to shop personnel only. This embodiment makes the demonstration function available through the operation of a particular combination of regular control buttons of the appliance, e.g. by pressing the volume-up and down buttons simultaneously, possibly for a predetermined period of time, e.g. 5 seconds. In this way, it is avoided that visitors who are not seriously interested in buying the appliance start the demonstration.

The invention is particularly suitable for a television receiver, the presentation means being the television screen or the loudspeakers, or for any other apparatus having a video output signal, such as a video recorder or DVD player, the presentation means being a built-in display or the screen of a connected television receiver. The invention is further applicable, for example, to audio equipment, in which the presentation means are the loudspeakers.

BRIEF DESCRIPTION OF THE DRAWINGS

These and other aspects of the invention will be apparent from and elucidated by way of a non-limitative example with reference to a FIGURE which shows a television receiver as an embodiment of the apparatus according to the invention.

DESCRIPTION OF EMBODIMENTS

The FIGURE shows a television receiver for receiving TV signals which are obtained via an antenna or cable network 1. A tuner 2 selects one of the received signals and demodulates it. Audio and video information from the selected signal is further processed in a signal processor 3 which comprises an audio processor 4 and a video processor 8. The audio information is processed by the audio processor 4 and presented by a loudspeaker 5. The video information is processed by the video processor 8 and presented on a display screen 9. A control unit 6 enables a user to enter commands which are processed by a microprocessor 7. For example, the microprocessor 7 relays commands to the tuner for selecting a TV signal, and commands to the signal processor 3 for controlling sound and picture parameters.

Furthermore, the microprocessor 7 is adapted to send audio and video information to the signal processor 3, and to control a signal switch 12, which initially selects the signals from the tuner 2 as input signals to the signal processor 3. A memory 10 is provided for storing the microprocessor instructions for performing the various functions of the television receiver. One of the functions implemented in this way is a demonstration function, the memory 10, the microprocessor 7 and the signal switch 12 thus constituting the demonstration means. The control unit 6 comprises a remote control unit (not shown) for receiving infrared signals from a remote control and a few buttons for controlling some major functions of the television receiver. The control unit 6 comprises, inter alia, a volume-up button 6a and a volume-down button 6b which enable the user to turn the volume up and down, respectively. When the user presses both the volume-up button 6a and the volume-down button 6b simultaneously for 5 seconds, the demonstration function is activated. Initially, a menu is displayed on the display screen 9 presenting a number of features which can be demonstrated, and an exit button is displayed for leaving the demonstration function. When the user selects one of the features, the picture information which is most suitable for demonstrating the selected feature is read from a memory 1, and the signal switch 12 is controlled in such a way that the picture information is selected as input signals to the signal processor 3. For example, when demonstrating a black-stretch feature, a picture comprising grey areas is presented. When a feature is selected which is intended to improve a presentation involving moving pictures, e.g. Natural Motion, a sequence of pictures is read from the memory 11 and presented consecutively as a moving video presentation. The moving video presentation is iterated a few times, giving the viewer multiple opportunities to appreciate the effect of the feature. As an example, the demonstration starts with the selected feature deactivated. After two seconds, the selected feature is activated, after another two seconds the selected feature is deactivated again, etc. This process is repeated a predetermined number of times after which the demonstration stops. Further signals, e.g. displayed or spoken text, could be provided to indicate which feature was selected and whether the selected feature is activated or deactivated at a particular moment.

Pressing either the volume-up button 6a or the volume-down button 6b stops the demonstration, and the microprocessor 7 controls the signal switch 12 to select the signals from the tuner 2 as input signals to the signal processor 3.

Although the invention has been described with reference to particular illustrative embodiments, variations and modifications are possible within the scope of the inventive concept. Thus, for example, storage means could be applied which are incorporated in a separate device connected in some way to the apparatus. Instead of demonstration contents ready to be presented, the storage means could contain the contents in an encoded or compressed form, e.g. an algorithm for generating a graphical picture which is particularly suited for showing the effect of the demonstrated feature. The memory 11 may be any storage device, such as a floppy disk or a hard disk, and may be combined with the memory 10. The user command does not need to comprise the operation of buttons on the apparatus, but could also be entered by means of one or more buttons on a remote control, or by means of a joystick or a mouse.

Although the embodiments are described with reference to video processing in a TV, the invention is also suitable for audio processing, or for signal-processing in other apparatuses which have to present information, such as VCRs, computer monitors, etc.

In summary, the invention relates to a device for demonstrating an effect of a selected signal-processing operation. The device comprises signal-processing means (3) for processing incoming signals to supply said signals to presentation means (9), and demonstration means (7, 10, 12) for demonstrating the selected processing operation. The device further comprises storage means (11) for storing a demonstration signal which is specifically suitable for effectively demonstrating the feature. Upon activation of the demonstration means, a demonstration signal which is most suitable for demonstrating said processing operation is read from the storage means, processed by the signal-processing means and presented on the presentation means.

What is claimed is:

1. A device for demonstrating an effect of a selected signal-processing operation, said device comprising:

a signal-processing device for processing an incoming signal according to said selected signal-processing operation to supply a processed signal to presentation means; and demonstration means for controlling the signal-processing device to perform said selected signal-processing operation in response to a user command, the demonstration means comprising:

storage means for storing a demonstration signal selected to allow an effective demonstration of the particular processing operation;

directing means of directing the demonstration signal to the signal processing device in response to said user command; and wherein the demonstration means are further adapted to activate and deactivate said processing operation repeatedly during the presentation of the demonstration signals, thereby demonstrating the effect of said selected signal processing operation on the demonstration signals.

2. A device as claimed in claim 1, wherein the directing means further comprises:

switching means for supplying, in response to said user command, either the incoming signals or the demonstration signals to the signal-processing device.

3. A device as claimed in claim 1, wherein said incoming signals are video signals and said presentation means comprises a display screen, and wherein the storage means are adapted to contain a static picture.

4. A device as claimed in claim 3, wherein the storage means are adapted to contain further pictures, the demonstration means being adapted to present said picture and said further pictures consecutively as a moving video presentation.

5. A device as claimed in claim 4, wherein the demonstration means are further adapted to repeat the moving video presentation automatically.

6. An apparatus for processing an audio or video signal, comprising a device as claimed in claim 1.

7. An apparatus as claimed in claim 6, comprising a number of user operable means for controlling functions of the apparatus, wherein said user command comprises the operation of a single one or a combination of said control means for a predetermined period of time.

8. A television receiver implemented as an apparatus as claimed in claim 6.

9. A method of demonstrating an effect of a selected signal-processing operation, the method comprising the steps of:

processing an incoming signal to supply a processed signal to presentation means; and controlling said selected signal-processing operation to be performed in response to a user command by:

reading a demonstration signal from storage means, which demonstration signal has been selected to allow an effective demonstration of said selected processing operation;

processing the demonstration signal according to said selected processing operation in response to said user command; and repeatedly activating and deactivating said processing operation during the presentation of the demonstration signal, thereby demonstrating the effect of said selected signal processing operation on the demonstration signals.

10. The method as claimed in claim 9, further comprising:

supplying, in response to said user command, either the incoming signals or the demonstration signals to the signal-processing device.

11. The method as claimed in claim 9, wherein said incoming signals are video signals and said presentation means comprises a display screen, and wherein the storage means are adapted to contain a static picture.

12. The method as claimed in claim 11, wherein the storage means are adapted to contain further pictures, the demonstration means being adapted to present said picture and said further pictures consecutively as a moving video presentation.

13. The method as claimed in claim 12, wherein the moving video presentation is automatically repeated.

14. The method as claimed in claim 9, wherein the step of processing the demonstration signal according to said selected processing operation in response to said user command further comprises:

processing an audio or video signal.

15. The method as claimed in claim 14, wherein said user command comprises the operation, for a predetermined period of time, of a single one or a combination of a number of user operable means for controlling functions of an apparatus.

16. The method as claimed in claim 14, wherein the step of processing an audio or video signal further comprises:

processing said audio or video signal within a television receiver.

* * * * *